US012643401B2

(12) United States Patent
Kawano et al.

(10) Patent No.: US 12,643,401 B2
(45) Date of Patent: Jun. 2, 2026

(54) DISPLAY APPARATUS FOR VEHICLE, DISPLAY METHOD, AND DISPLAY PROGRAM

(71) Applicant: TOYOTA JIDOSHA KABUSHIKI KAISHA, Toyota (JP)

(72) Inventors: Takahiro Kawano, Chofu (JP); Toshifumi Iwase, Tokyo (JP); Hisanobu Inoue, Kawasaki (JP); Hironori Ito, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 93 days.

(21) Appl. No.: 18/672,542

(22) Filed: May 23, 2024

(65) Prior Publication Data

US 2024/0399866 A1      Dec. 5, 2024

(30) Foreign Application Priority Data

May 31, 2023      (JP) ................................. 2023-090241

(51) Int. Cl.
 *B60K 35/22*        (2024.01)
 *B60W 50/14*        (2020.01)

(52) U.S. Cl.
 CPC ............. *B60K 35/22* (2024.01); *B60W 50/14* (2013.01); *B60K 2360/166* (2024.01); *B60K 2360/167* (2024.01); *B60K 2360/175* (2024.01); *B60K 2360/178* (2024.01); *B60W 2050/146* (2013.01)

(58) Field of Classification Search
 None
 See application file for complete search history.

(56)                 References Cited

U.S. PATENT DOCUMENTS

| | | | |
|---|---|---|---|
| 2008/0294339 A1* | 11/2008 | Tauchi ............... | G01C 21/3469 |
| | | | 701/123 |
| 2016/0305787 A1* | 10/2016 | Sato ................. | G08G 1/096844 |
| 2021/0048815 A1* | 2/2021 | McErlean ............. | B60W 50/14 |
| 2021/0256846 A1* | 8/2021 | McErlean ............. | G08G 1/091 |

FOREIGN PATENT DOCUMENTS

| | | |
|---|---|---|
| JP | 2004-361238 A | 12/2004 |
| JP | 2008-269178 A | 11/2008 |
| JP | 2019-148677 A | 9/2019 |

* cited by examiner

*Primary Examiner* — James J Lee
*Assistant Examiner* — Andrew Sang Kim
(74) *Attorney, Agent, or Firm* — Dinsmore & Shohl LLP

(57)                 ABSTRACT

A display apparatus for vehicle is provided in a vehicle capable of executing vehicle control including drive assistance control and autonomous driving control. The display apparatus includes an ECU configured to: generate a trial course for the vehicle control based on map information and a virtual destination of the vehicle; acquire statistical information regarding a past operation of the vehicle control in which past operation information of the vehicle control and a position on a map are stored in association with each other; calculate a trial result regarding an operation of the vehicle control according to a trial setting value regarding the vehicle control when the vehicle is caused to virtually travel along the trial course; generate a trial image for causing an occupant of the vehicle to recognize alert information of the statistical information in advance; and cause a display unit of the vehicle to display the trial image.

4 Claims, 6 Drawing Sheets

DISPLAY APPARATUS FOR VEHICLE, DISPLAY METHOD, AND DISPLAY PROGRAM

TECHNICAL FIELD

The present disclosure relates to a display apparatus for vehicle, a display method, and a display program.

CROSS-REFERENCE TO RELATED APPLICATION

This application claims the benefit of priority from Japanese Patent Application No. 2023-090241, filed on May 31, 2023, the entire contents of which are incorporated herein by reference.

BACKGROUND

In the related art, a system for creating a virtual reality image of a road on which a driver performs virtual reality traveling with a vehicle based on a detection result for an amount of vehicle operation performed by the driver and map information, and displaying the virtual reality image to the driver so that the driver learns to drive to a destination in the virtual reality has been disclosed (for example, Japanese Patent Application Laid-Open No. 2019-148677).

Vehicle control including drive assistance control and autonomous driving control is possible to operate without conforming to an intention of the occupant, for example, depending on a road situation when a vehicle travels through a place that an occupant visits for the first time.

SUMMARY

One aspect of the present disclosure is a display apparatus for vehicle provided in a vehicle capable of executing vehicle control including drive assistance control and autonomous driving control, the display apparatus for vehicle including: a trial course generation unit configured to generate a trial course for the vehicle control based on map information and a virtual destination of the vehicle; an information acquisition unit configured to acquire statistical information regarding a past operation of the vehicle control in which past operation information of the vehicle control and a position on a map are stored in association with each other; a trial result calculation unit configured to calculate a trial result regarding an operation of the vehicle control according to a trial setting value regarding the vehicle control when the vehicle is caused to virtually travel along the trial course, based on the trial setting value and the trial course; an image generation unit configured to generate a trial image for causing an occupant of the vehicle to recognize alert information of the statistical information in advance, based on the statistical information on the trial course and the trial result; and a display control unit configured to cause a display unit of the vehicle to display the trial image.

With the display apparatus for vehicle according to the aspect of the present disclosure, the trial result regarding the operation of the vehicle control according to the trial setting value when the vehicle is caused to virtually travel along the trial course is calculated based on the trial course and the trial setting value. The trial image generated based on the statistical information on the trial course and the trial result is displayed on the display unit of the vehicle. This makes it possible for the occupant to recognize in advance how the vehicle control will operate depending on a road situation, using the alert information on the trial course as a clue.

In one embodiment, the display apparatus for vehicle may further include a notification information storage unit configured to store notification information including an alert position on the trial course corresponding to the alert information, and the trial setting value, wherein the image generation unit generates a notification image including the trial setting value based on the notification information when the vehicle travels on the trial course as an actual course of the vehicle control, and the display control unit causes the display unit to display the notification image when a position of the vehicle approaches a position on the map corresponding to the alert position.

In one embodiment, the trial setting value may be a set vehicle speed regarding the autonomous driving control among the vehicle controls, and the alert information may be information on temporary suspension of the autonomous driving control based on a vehicle speed of the vehicle executing the autonomous driving control when the vehicle travels on a curve.

Another aspect of the present disclosure is a display method using a display apparatus for vehicle provided in a vehicle capable of executing vehicle control including drive assistance control and autonomous driving control, the display method including: generating a trial course for the vehicle control based on map information and a virtual destination of the vehicle; acquiring statistical information regarding a past operation of the vehicle control in which past operation information of the vehicle control and a position on a map are stored in association with each other; calculating a trial result regarding an operation of the vehicle control according to a trial setting value regarding the vehicle control when the vehicle is caused to virtually travel along the trial course, based on the trial setting value and the trial course; generating a trial image for causing an occupant of the vehicle to recognize alert information of the statistical information in advance, based on the statistical information on the trial course and the trial result; and causing a display unit of the vehicle to display the trial image.

With the display method according to the other aspect of the present disclosure, the trial result regarding the operation of the vehicle control according to the trial setting value when the vehicle is caused to virtually travel along the trial course is calculated based on the trial course and the trial setting value. The trial image generated based on the statistical information on the trial course and the trial result is displayed on the display unit of the vehicle. This makes it possible for the occupant to recognize in advance how the vehicle control will operate depending on a road situation, using the alert information on the trial course as a clue.

Still another aspect of the present disclosure is a display program for causing a computer to function as a display apparatus for vehicle provided in a vehicle capable of executing vehicle control including drive assistance control and autonomous driving control, the display program causing the computer to function as: a trial course generation unit configured to generate a trial course for the vehicle control based on map information and a virtual destination of the vehicle; an information acquisition unit configured to acquire statistical information regarding a past operation of the vehicle control in which past operation information of the vehicle control and a position on a map are stored in association with each other; a trial result calculation unit configured to calculate a trial result regarding an operation of the vehicle control according to a trial setting value regarding the vehicle control when the vehicle is caused to virtually travel along the trial course, based on the trial setting value and the trial course; an image generation unit configured to generate a trial image for causing an occupant of the vehicle to recognize alert information of the statistical information in advance, based on the statistical information on the trial course and the trial result; and a display control unit configured to cause a display unit of the vehicle to display the trial image.

With the display program according to the still other aspect of the present disclosure, the trial result regarding the operation of the vehicle control according to the trial setting value when the vehicle is caused to virtually travel along the trial course is calculated based on the trial course and the trial setting value. The trial image generated based on the statistical information on the trial course and the trial result is displayed on the display unit of the vehicle. This makes it possible for the occupant to recognize in advance how the vehicle control will operate depending on a road situation, using the alert information on the trial course as a clue.

According to some aspects of the present disclosure, it is possible for the occupant to recognize in advance how the vehicle control will operate depending on a road situation.

DETAILED DESCRIPTION

Hereinafter, an embodiment of the present disclosure will be described with reference to the drawings. In the following description, the same or corresponding elements are denoted by the same reference signs, and redundant description thereof will be omitted.

Figure 1:
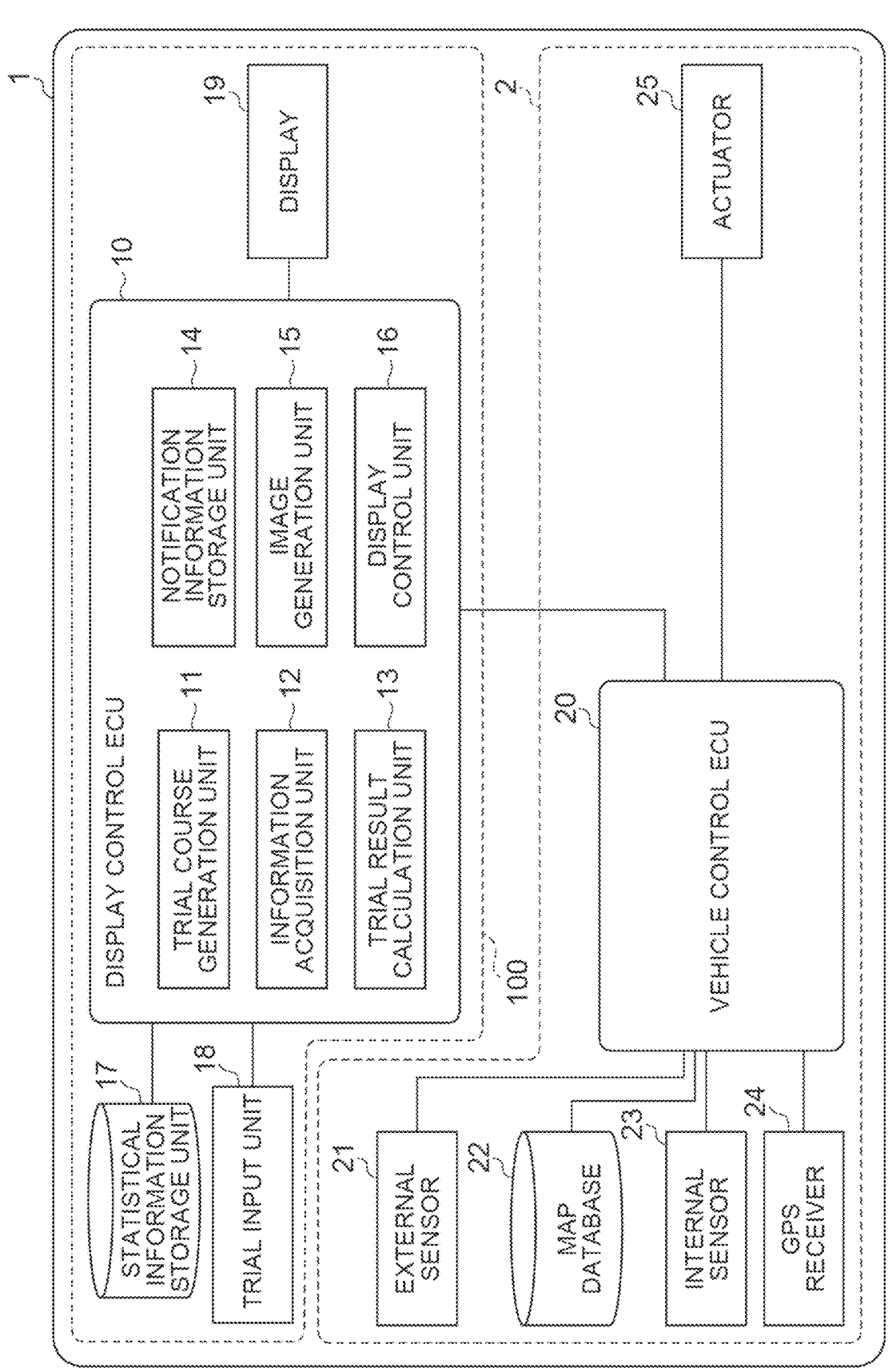
FIG. 1 is a block diagram showing a vehicle including a display apparatus for vehicle according to an embodiment.

FIG. 1 is a block diagram showing a vehicle including a display apparatus for vehicle according to an embodiment. As shown in FIG. 1, a display apparatus for vehicle 100 (hereinafter referred to simply as display apparatus 100) is provided in a vehicle 1 capable of executing vehicle control including drive assistance control and autonomous driving control. The vehicle 1 is, for example, a passenger car.

[Configuration of Vehicle Control System]

The vehicle 1 has a vehicle control system 2 mounted thereon. The vehicle control system 2 is a system that executes vehicle control including the drive assistance control and the autonomous driving control of the vehicle 1. The drive assistance control is vehicle control for automatically controlling any one or both of acceleration, deceleration, and steering of the vehicle 1 to cause the vehicle 1 to travel. The drive assistance control includes, for example, at least one of lane tracing assistance, lane keep control, adaptive cruise control, radar cruise control, and road sign assistance. The autonomous driving control is vehicle control for causing the vehicle 1 to autonomously travel along a road on which the vehicle 1 travels, without the driver performing a driving operation. The autonomous driving control may include at least one of traffic jam assistance, lane change assistance, and overtaking assistance.

The vehicle control system 2 includes a vehicle control electronic control unit (ECU) 20, an external sensor 21, a map database 22, an internal sensor 23, a global positioning system (GPS) receiver 24, and an actuator 25.

The vehicle control ECU 20 is an electronic control unit that includes a central processing unit (CPU), a read only memory (ROM), a random access memory (RAM), a controller area network (CAN) communication circuit, and the like. The vehicle control ECU 20 controls hardware based on signals output from the CPU, and realizes functions of the vehicle control ECU 20, which will be described later. As an example of a more specific operation, the vehicle control ECU 20 operates a CAN communication circuit to input and output data, stores the input data in the RAM, loads a program stored in the ROM into the RAM, and executes the program loaded into the RAM. The vehicle control ECU 20 may include a plurality of electronic units. Some of the functions of the vehicle control ECU 20 may be executed by a server that can communicate with the vehicle 1.

The external sensor 21 includes at least one of a camera and a radar sensor. The camera is an imaging device that captures a surrounding situation of the vehicle 1. The camera is provided, for example, on the back side of a windshield of the vehicle 1, and images an area in the front of the vehicle. The radar sensor is a detection device that detects objects around the vehicle 1 using radio waves (for example, millimeter waves) or light. Examples of the radar sensor include radar (millimeter wave radar) or light detection and ranging (LiDAR). The external sensor 21 transmits the captured image and detection information regarding surrounding objects to the vehicle control ECU 20.

The map database 22 is a database that stores map information. The map database 22 is formed in a recording device such as a hard disk drive (HDD) mounted on the vehicle 1, for example. The map information stored in the map database 22 includes, for example, position information of roads, shape information of the roads (for example, curvature information), and position information of intersections and branch points. The map information may include so-called high-accuracy map information in which the accuracy of road positions, road shapes, and the like is higher than the accuracy of those of a navigation map.

The internal sensor 23 is an in-vehicle sensor that detects a traveling state of the vehicle 1. The internal sensor 23 may include a vehicle speed sensor, an acceleration sensor, and a yaw rate sensor. Known sensors can be used as the vehicle speed sensor, the acceleration sensor, and the yaw rate sensor. The internal sensor 23 transmits detection information regarding the traveling state of the vehicle 1 to the vehicle control ECU 20.

A GPS receiver 24 measures a position of the vehicle 1 (for example, a latitude and longitude of the vehicle 1) by receiving signals from three or more GPS satellites. The GPS receiver 24 transmits measured position information of the vehicle 1 to the vehicle control ECU 20.

The actuator 25 is a device that is used for control of traveling of the vehicle 1, and operates according to a control signal from the vehicle control ECU 20. The actuator 25 includes at least a drive actuator, a brake actuator, and a steering actuator. The drive actuator is provided in, for example, an engine or a motor as a power source, and controls a driving force of the vehicle 1. The brake actuator is provided, for example, in a hydraulic brake system and controls a braking force that is assigned to wheels of the vehicle 1. The steering actuator is, for example, an assistance motor of an electric power steering system, and controls a steering torque of the vehicle 1.

The vehicle control ECU 20 is configured to be able to recognize the position of the vehicle 1 on the map, an external environment of the vehicle 1, and the traveling state of the vehicle 1.

The vehicle control ECU 20 recognizes the external environment around the vehicle 1 based on detection information of the external sensor 21. The external environment includes a position of an object with respect to the vehicle 1, a relative speed of the object with respect to the vehicle 1, a moving direction of the object with respect to the vehicle 1, and the like. The object includes a moving object such as another vehicle around the vehicle 1 and a stationary object such as a structure around the vehicle 1. The external environment includes lane markings recognized by lane marking recognition processing, a road shape, and an aisle shape of a toll gate from the detection information of the external sensor 21.

The vehicle control ECU 20 is configured to be able to acquire the map information that is used for vehicle control. The vehicle control ECU 20 acquires the map information from the map database 22. The vehicle control ECU 20 may acquire the map information from the server that can communicate with the vehicle 1 via a communication network.

The vehicle control ECU 20 recognizes the traveling state of the vehicle 1 based on a detection result of the internal sensor 23. The traveling state includes, for example, a vehicle speed of the vehicle 1, an acceleration of the vehicle 1, and a yaw rate of the vehicle 1.

The vehicle control ECU 20 acquires the position of the vehicle 1 on the map based on position information of the GPS receiver 24 and the map information. The vehicle control ECU 20 may recognize the position of the vehicle 1 on the map using a Simultaneous Localization and Mapping (SLAM) technology.

The vehicle control ECU 20 generates a travel plan for the vehicle 1 based on the destination, the map information, the position of the vehicle 1 on the map, the external environment, and the traveling state (the vehicle speed, yaw rate, or the like). The destination may be a destination set by the occupant including the driver, or may be a destination proposed by the vehicle control system 2.

The course of the vehicle 1 is a travel trajectory on which the traveling vehicle 1 is scheduled to travel in the future under autonomous driving control. The vehicle control ECU 20 calculates a target route (route on a per-lane basis) for the vehicle 1 to the destination based on the destination, a current position of the vehicle 1 on the map, and the map information.

The vehicle control ECU 20 calculates a speed pattern (speed plan) for the vehicle 1 to travel along the course. The vehicle control ECU 20 calculates the speed pattern of the vehicle 1 based on a set speed for the autonomous driving control set by the occupant, a speed limit (for example, a legal maximum speed) included in the map information, position information of a temporary stop line, traffic lights or the like included in the map information, the external environment such as preceding vehicles, pedestrians, and the like. The vehicle control ECU 20 calculates the course and speed pattern of the vehicle 1 to generate a travel plan including the course and speed pattern of the vehicle 1.

The vehicle control ECU 20 executes autonomous driving control of the vehicle 1 based on the generated travel plan. The vehicle control ECU 20 transmits a control signal to the actuator 25 to control a vehicle speed and a steering angle of the vehicle 1 and execute autonomous driving control.

[Configuration of Display Apparatus for Vehicle]

Next, a configuration of the display apparatus 100 according to the present embodiment will be described. The display apparatus 100 is a device that displays an image regarding trial vehicle control. The trial vehicle control is vehicle control in a virtual reality space for causing the occupant to experience in advance how the vehicle control operates depending on a road situation, before the vehicle control including the drive assistance control and the autonomous driving control are actually executed. The display apparatus 100 mainly includes a display control ECU 10, a statistical information storage unit 17, a trial input unit 18, and a display (display unit) 19 mounted on the vehicle 1. The display apparatus 100 may include the map database 22 and the GPS receiver 24 for acquiring the map information and the position of the vehicle 1 on the map (hereinafter simply referred to as a position of the vehicle 1).

The display control ECU 10 is an electronic control unit that includes a CPU, ROM, RAM, CAN communication circuit, and the like. The display control ECU 10 controls a display 19. The display control ECU 10 may be an electronic control unit built into the display 19. The display control ECU 10 may be a part of the vehicle control ECU 20. The display control ECU 10 may include a plurality of electronic units. The display control ECU 10 is communicatively connected to, for example, the vehicle control ECU 20. Some of functions of the display control ECU 10 may be executed by the server that can communicate with the vehicle 1.

The statistical information storage unit 17 is a database that stores statistical information. The statistical information is information on a past operation of the vehicle control. In the statistical information storage unit 17, past operation information of the vehicle control and a position on the map are stored in association with each other as the statistical information. The "past operation information of the vehicle control" is an accumulation of information on results of the vehicle 1 and other vehicles executing the vehicle control in the past. The "past operation information of the vehicle control" includes, for example, information such as how the vehicle speed or steering angle of the vehicle 1 has been controlled through the vehicle control, whether or not the vehicle control has been automatically canceled, and how the travel plan including a course and a speed pattern of the autonomous driving control has been corrected. The statistical information storage unit 17 is formed in a recording device such as a hard disk drive (HDD) mounted on the vehicle 1, for example. The statistical information storage unit 17 may be formed in a recording device of the server that can communicate with the vehicle 1.

The trial input unit 18 is a device that accepts a trial input from the occupant of the vehicle 1. The trial input means an input of a condition setting regarding trial vehicle control. The trial input includes, for example, a virtual destination of the vehicle 1 and a trial setting value regarding the vehicle control. The virtual destination is a destination in the virtual reality space for causing the occupant to experience in advance how the vehicle control operates. The trial setting value includes various parameters of the vehicle control that can be set by the occupant, which are used when the occupant is caused to experience in advance how the vehicle control operates. A specific example of the trial setting value will be described later.

As the trial input unit 18, for example, an input unit of a human machine interface (HMI) (for example, a touch panel display, buttons, or the like of a car navigation device) provided in the vehicle 1 can be used. The trial input unit 18 receives an input operation of the occupant as the trial input. The trial input unit 18 transmits information on the received trial input from the occupant to the display control ECU 10.

The display 19 is a display device that is mounted on the vehicle 1 and displays an image to the driver. The image is displayed in a predetermined display area of the display 19. The display 19 is controlled by the display control ECU 10 and displays an image in the display area. A display device in which sizes of figures, shapes of the figures, luminance, colors, and the like can be changed is used as the display 19.

As an example of the display 19, a head mounted display (HMD) provided inside the vehicle 1 is used. As the display 19, a head up display (HUD), a liquid crystal display of a navigation system, or a liquid crystal display provided in front of the driver on an instrument panel (so-called multi-information display (MID) may be used. The head-up display is a display device that projects an image from a projection unit installed in the instrument panel of the vehicle 1 onto a display surface of a front windshield (a reflective surface inside the front windshield).

Hereinafter, functions of the display control ECU 10 will be described. As shown in FIG. 1, the display control ECU 10 includes a trial course generation unit 11, an information acquisition unit 12, a trial result calculation unit 13, a notification information storage unit 14, an image generation unit 15, and a display control unit 16 as functional configurations.

The display control ECU 10 may cause the trial vehicle control to function, for example, when the occupant performs an input to the trial input unit 18 to enable a "trial mode". The display control ECU 10, for example, enables the trial mode on condition that the vehicle 1 is located in a garage of a home of the occupant, the vehicle 1 is completely stopped, and a shift position is in a P range. The trial course generation unit 11, for example, may enable the trial mode on condition that the vehicle 1 is located in a parking area or the like, the vehicle 1 is completely stopped, and the shift position is in the P range.

The trial course generation unit 11 acquires the position of the vehicle 1 as a trial start position. The trial start position is a position on the map that is a starting point of the trial vehicle control of the display control ECU 10. The trial course generation unit 11 acquires the trial start position, for example, while the vehicle 1 is parked, not when the vehicle 1 is temporarily stopped, such as waiting at a traffic light. The trial course generation unit 11 here can use the position of the vehicle 1 recognized by the vehicle control ECU 20.

The trial course generation unit 11 generates a trial course for the vehicle control based on the map information and the virtual destination of the vehicle 1. The trial course generation unit 11 acquires, for example, the virtual destination of the vehicle 1 that the occupant has input to the trial input unit 18. The trial course generation unit 11 generates a trial course for the vehicle 1 from the trial start position to the virtual destination based on the trial start position, the virtual destination, and the map information, for example, as in a calculation scheme in the vehicle control ECU 20. The trial course corresponds to a virtual target route (a route on a per-lane basis). The trial course generation unit 11 here can use the map information acquired by the vehicle control ECU 20.

The information acquisition unit 12 acquires statistical information regarding the past operation of the vehicle control in which the past operation information of the vehicle control and the position on the map are stored in association with each other. The information acquisition unit 12 acquires, for example, statistical information along a trial course from the trial start position to the virtual destination.

The trial result calculation unit 13 calculates the trial result based on the trial setting value and the trial course regarding the vehicle control. The trial result means an output regarding the vehicle control operation according to the trial setting value when the vehicle 1 is caused to virtually travel along the trial course.

The trial result calculation unit 13 acquires, for example, the trial setting value that the occupant has input to the trial input unit 18. The trial result calculation unit 13 causes the vehicle 1 to virtually travel on the trial course while executing the vehicle control according to the trial setting value. For example, when alert information is present on the trial course on which the vehicle 1 virtually travels, the trial result calculation unit 13 calculates content of the alert information, a point on the trial course where there has been the alert information, and the trial setting value used during execution of the vehicle control, as the trial result.

The alert information may include an unexpected operation in the vehicle control according to the trial setting value. The "unexpected operation" means that a likelihood that an operation that does not conform to the assumption of the occupant performs based on the statistical information exists with a predetermined probability or more in the vehicle control according to the trial setting value. The unexpected operation includes, for example, automatically canceling vehicle control without conforming to the assumption of the occupant, control of the vehicle speed of the vehicle 1 that does not conform to the assumption of the occupant, and control of the steering angle of the vehicle 1 that does not conform to the assumption of the occupant.

It is possible for the alert information to exist, for example, at a specific place on the trial course where there is a likelihood of misrecognition of the external sensor 21 due to external factors. Situations of FIGS. 2 to 4 will be described examples of the alert information.

Figure 2:
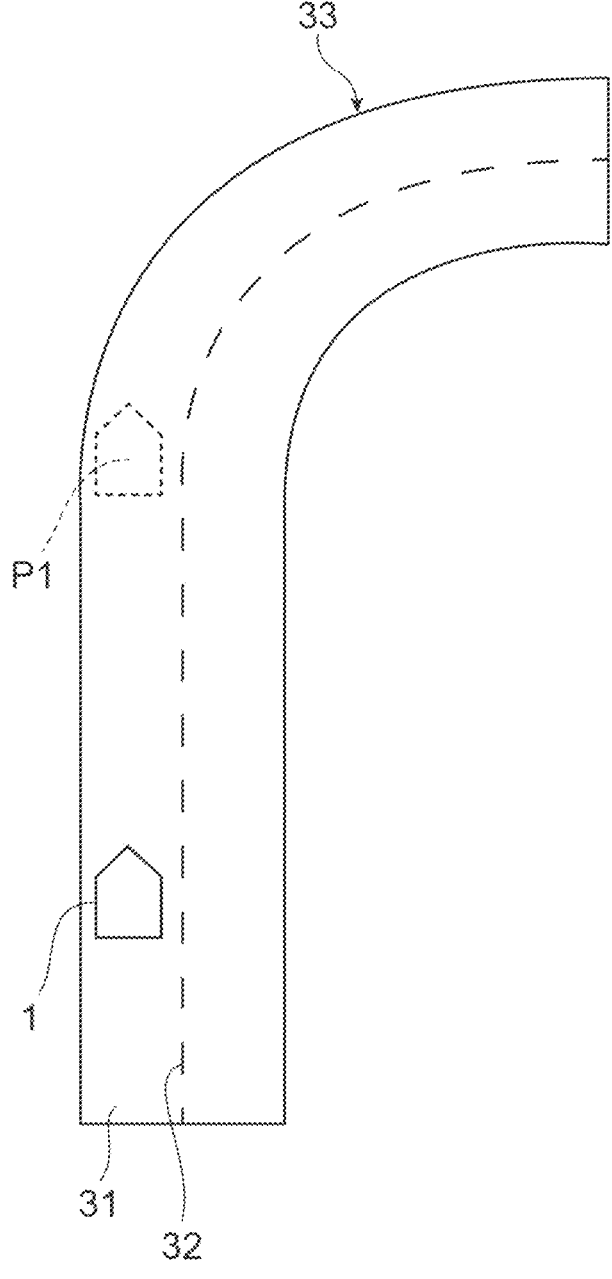
FIG. 2 is a diagram showing an example of alert information.

The alert information may be information on temporary suspension of the autonomous driving control based on the vehicle speed of the vehicle 1 when the vehicle 1 executing the autonomous driving control travels on a curve. FIG. 2 is a diagram showing an example of the alert information. In FIG. 2, a situation in which the vehicle 1 executing the autonomous driving control is traveling in a host lane 31 along a center line 32 is shown. There is a curve 33 in front of the vehicle 1. In the example of FIG. 2, a set vehicle speed for the autonomous driving control that is being executed is lower than the maximum vehicle speed for the autonomous driving control allowed in a straight portion of the host lane 31, and is higher than a maximum vehicle speed for the autonomous driving control allowed in the curve 33. At a position P1 where the vehicle approaches the curve 33 from the straight portion of the host lane 31, there is a likelihood that the vehicle control will be automatically canceled without conforming to the assumption of the occupant. In this case, the point on the trial course where there has been the alert information is the position P1.

Figure 3:
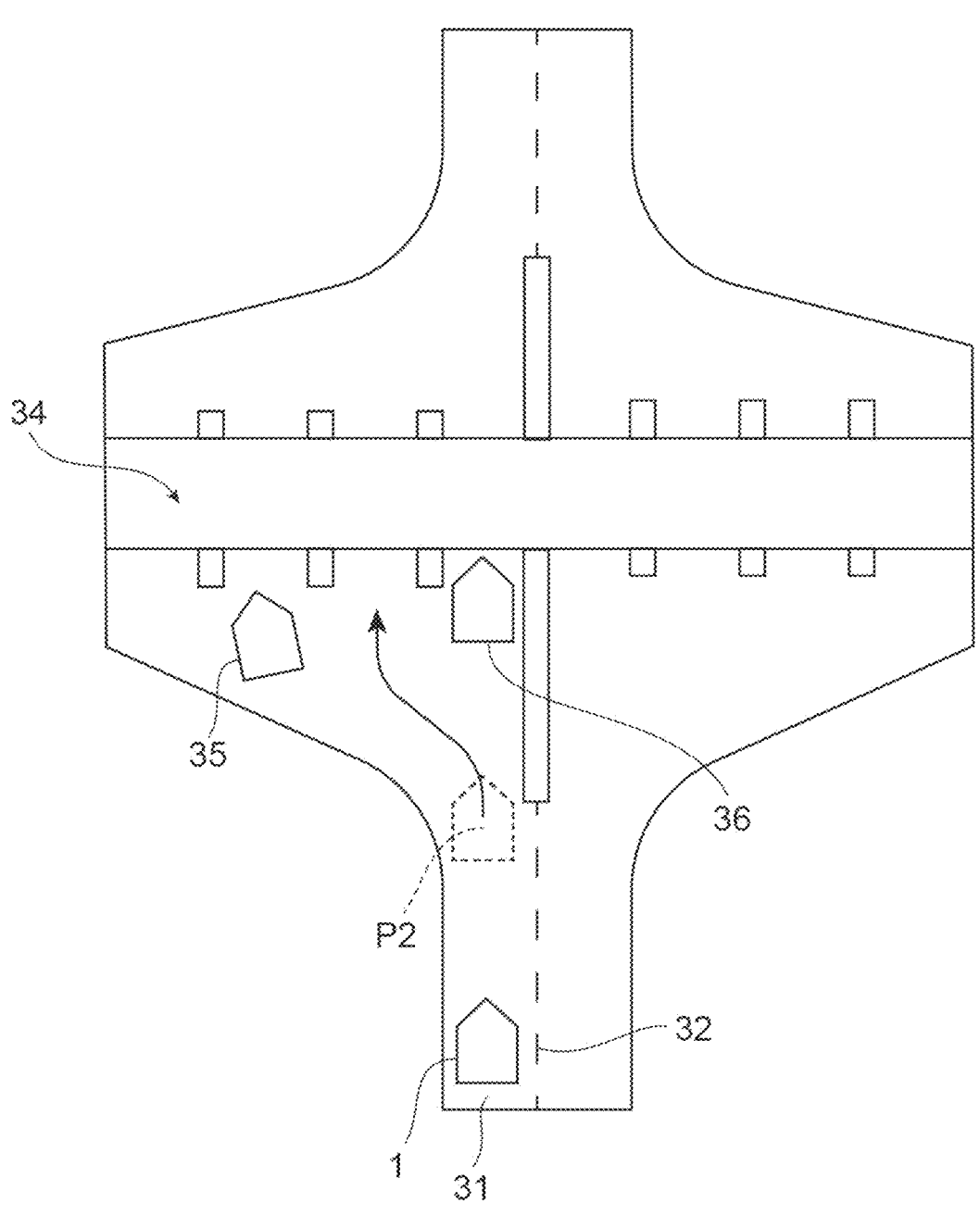
FIG. 3 is a diagram showing another example of the alert information.

The alert information may be information on an unintended operation of the autonomous driving control based on a situation of another vehicle in front of the vehicle 1 when the vehicle 1 executing the autonomous driving control travels through a toll gate. FIG. 3 is a diagram showing another example of the alert information. In FIG. 3, a situation in which the vehicle 1 executing the autonomous driving control is traveling in the host lane 31 toward a toll gate 34 along the center line 32 is shown. In front of the vehicle 1, there are other vehicles 35 and 36 that are decelerating to pass through a gate of the toll gate 34. In the example of FIG. 3, the occupant assumes that the vehicle 1 is traveling as indicated by a solid arrow pointing toward a gate where the other vehicles 35 and 36 are not present. Here, the autonomous driving control is possible to perform an unintended operation without conforming to the assumption of the occupant, based on a result of detecting a structure of the toll gate 34 or the other vehicle 36 using the external sensor 21 of the vehicle 1. If the autonomous driving control performs the unintended operation when the vehicle 1 is located at a position P2, the point on the trial course where there has been the alert information is the position P2.

Figure 4:
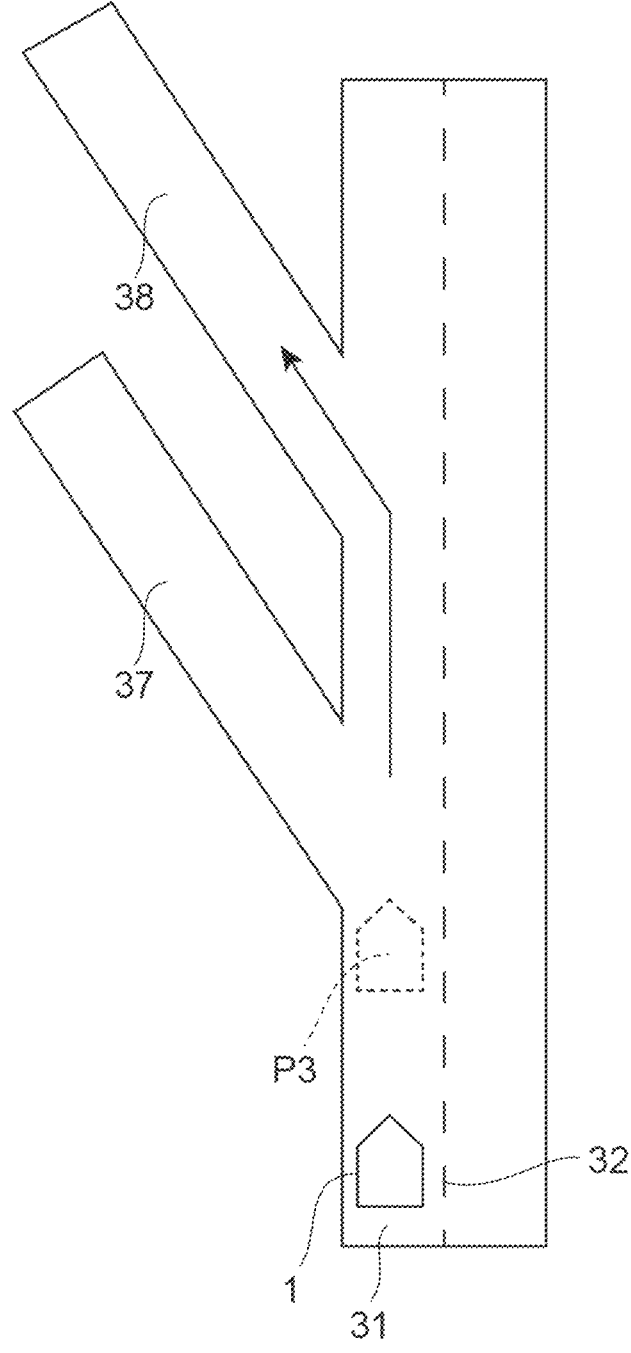
FIG. 4 is a diagram showing still another example of the alert information.

The alert information may be information for an operation of the drive assistance control in which misguidance occurs when the vehicle 1 executing the drive assistance control approaches a plurality of branch roads. FIG. 4 is a diagram showing still another example of the alert information. In FIG. 4, a situation in which the vehicle 1 executing, for example, the lane tracing assistance as the drive assistance control is traveling in the host lane 31 along the center line 32 to approach a plurality of branch roads 37 and 38 is shown. In the example of FIG. 4, the occupant assumes that the vehicle 1 is caused to travel toward the branch road 38, as indicated by the solid arrow pointing toward the branch road 38. Here, the lane tracing assistance is possible to be operated without conforming to the assumption of the occupant. The lane tracing assistance that does not conform to the assumption of the occupant is, for example, that a steering wheel of the vehicle 1 is erroneously assisted with the sensitivity of the lane tracing assistance and an amount of yaw assistance that misguides the vehicle 1 to the branch road 37 in front of the branch road 38. When the vehicle 1 has been misguided at a position P3 before the branch road 37, the point on the trial course where there has been the alert information is the position P3.

In addition, it is possible for lane markings to be misrecognized and for the alert information to be present for example, at a place where the lane markings have deteriorated over time or have been repainted.

The notification information storage unit 14 stores the notification information including an alert position on the trial course corresponding to the alert information and the trial setting value. The notification information is information stored so that the occupant is notified of the information when the vehicle 1 travels on a trial course corresponding to the trial mode as an actual course of the vehicle control. The alert position is a point at which the occupant is alerted when the vehicle 1 travels on the trial course as the actual course of the vehicle control among points on the trial course where there is the alert information. For example, the alert position in the case of FIGS. 2 to 4 above is a position among the positions P1 to P3 where alert to the occupant is performed when the vehicle 1 travels on the trial course as the actual course of the vehicle control. For example, when there is a plurality of alert pieces of information on the trial course, the notification information storage unit 14 may store the notification information for the alert information of a desired notification target selected by the occupant. The notification information storage unit 14 may accept an operation with respect to the trial input unit 18 for the occupant to select the desired notification target.

The image generation unit 15 generates the trial image based on the statistical information on the trial course and the trial result. The trial image is an image for causing the occupant of the vehicle 1 to recognize the alert information in the statistical information in advance. The image generation unit 15 generates, for example, a trial image indicating a situation in which the vehicle 1 virtually travels through a point on the trial course where there is the alert information. The trial image includes at least one of the content of the alert information, the point on the trial course where there has been the alert information, and the trial setting value used during execution of the vehicle control.

The trial image may be a bird's eye view image showing the vehicle 1 viewed down from behind. The trial image includes, for example, a host vehicle image that is displayed in association with the position of the vehicle 1 in a lane in which the vehicle 1 is currently traveling, when the vehicle 1 is viewed down from behind. The trial image may include an object image that is displayed in association with a position of object such as another vehicle around the vehicle 1. At least one of the content of the alert information, the point on the trial course where there has been the alert information, and the trial setting value used during execution of vehicle control may be superimposed on the bird's eye view image.

The image generation unit 15 may cause a trial image indicating, on the map, the point on the trial course where there is the alert information to be displayed, instead of the bird's eye view image.

When there is a plurality of alert pieces of information, the image generation unit 15 may generate a plurality of trial images corresponding to a plurality of alert pieces of information. The image generation unit 15 may organize the plurality of trial images into a list by adding, for example, a title indicating a type of alert information. The title may be, for example, cancellation of automatic driving, sudden deceleration, and misguidance. The image generation unit 15 may rearrange and organize the plurality of trial images in order from the alert information close to the trial start position along the trial course.

The image generation unit 15 may generate a notification image including the trial setting value based on the notification information when the vehicle travels on the trial course as the actual course of the vehicle control. The notification image is an image for presenting notification information as a result of preparation in the trial mode to the occupant when the vehicle 1 travels the trial course corresponding to the trial mode as the actual course of the vehicle control. The image generation unit 15 generates, for example, a notification image including an image indicating a surrounding situation of the alert position included in the stored notification information and an image indicating the trial setting value included in the stored notification information, based on the stored notification information. The image generation unit 15 may generate a notification image that pops up in a partial area of a navigation screen, for example. The image generation unit 15 may generate a notification image that is used as an interrupt notification to a multi-information display such as a meter or a head-up display, for example.

The display control unit 16 causes the display 19 of the vehicle 1 to display the trial image. The display control unit 16 causes the display 19 to display the trial image, thereby providing alert information to the occupant of the parked vehicle 1. The occupant of the vehicle 1 can make advance preparation regarding the alert information when the vehicle 1 travels on the trial course as the actual course of the vehicle control, by causing the occupant of the vehicle 1 to be aware of the alert information in advance. Furthermore, it is possible to adjust in advance and try various parameters of the vehicle control that can be set by the occupant, so that the vehicle control does not perform the unexpected operation, by the occupant changing the trial setting value.

In the example of FIG. 2, there is a likelihood that the vehicle control will be automatically canceled without conforming to the assumption of the occupant as the unexpected operation. The occupant of the vehicle 1 can try the set vehicle speed for autonomous driving control in which the vehicle control is not automatically cancelled without conforming to the assumption of the occupant when the occupant of the vehicle 1 recognizes the alert information. Thus, the trial setting value may be the set vehicle speed regarding the autonomous driving control among the vehicle controls.

In the example of FIG. 3, there is a likelihood that the autonomous driving control will perform an unintended operation without conforming to the assumption of the occupant as the unexpected operation. When the occupant of the vehicle 1 recognizes this alert information, the occupant of the vehicle 1 may try parameters (for example, a set vehicle distance) of the autonomous driving control in which the autonomous driving control does not perform an unintended operation without conforming to the assumption of the occupant.

In the example shown in FIG. 4, there is a likelihood that the lane tracing assistance operates without conforming to the assumption of the occupant as the unexpected operation. When the occupant of the vehicle 1 recognizes this alert information, the occupant of the vehicle 1 tries the sensitivity of the lane tracing assistance and the amount of yaw assistance so that the lane tracing assistance does not operate without conforming to the assumption of the occupant. Thus, the trial setting value may be a setting sensitivity regarding the drive assistance control among the vehicle controls. The trial setting value may be a set assistance amount regarding the drive assistance control among the vehicle controls. In this case, it is possible to smoothly assist in operation intervention of the occupant by performing the operation of the drive assistance control to expected extent while cubing the operation of the drive assistance control to unexpected extent, on the branch road 37.

The display control unit 16 may cause the display 19 of the vehicle 1 to display the notification image. The display control unit 16 causes the display 19 of the vehicle 1 to display the generated notification image. The display control unit 16 provides the notification information to the occupant of the vehicle 1 traveling actually on the trial course as the actual course of the vehicle control by causing the display 19 to display the notification image. The occupant (driver) of the traveling vehicle 1 can refer to the trial setting value shown in the notification image and adjust various parameters that can be set by the occupant in the actual vehicle control that is being executed.

When the display control unit 16 determines that the position of the vehicle 1 has actually approached the position on the map corresponding to the alerting position, the display control unit 16 may cause the display 19 of the vehicle 1 to display the notification image. For example, when a distance between the position of the vehicle 1 on the map and a position on the map corresponding to the alert position is actually equal to or smaller than a predetermined approach threshold, the display control unit 16 determines that the position of the vehicle 1 has approached the position on the map corresponding to the alert position. For example, when the distance between the position of the vehicle 1 on the map and the position on the map corresponding to the alert position is actually larger than the predetermined approach threshold, the display control unit 16 determines that the position of the vehicle 1 does not approach a position on the map corresponding to the alert position. The approach threshold is a threshold of the distance between the position of the vehicle 1 on the map and the position on the map corresponding to the alert position, for switching whether or not to display the notification image.

[Processing of Display Apparatus for Vehicle, Display Method, and Processing of Display Program]

Figure 5:
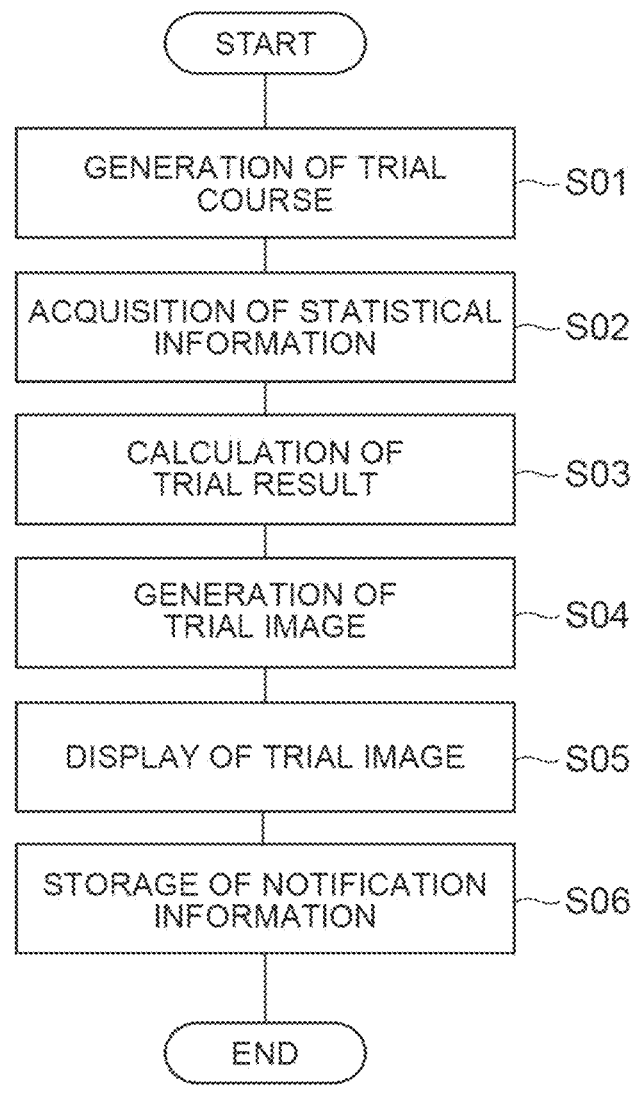
FIG. 5 is a flowchart showing an example of trial image display processing.

Next, an example of the processing of the display apparatus 100 will be described with reference to the flowcharts of FIGS. 5 and 6. FIG. 5 is a flowchart showing an example of processing of the display control ECU of the display apparatus for vehicle. The processes (steps) shown in FIG. 5 are repeatedly executed at every predetermined calculation cycle, for example, when the trial mode is enabled due to an input from the occupant of the vehicle 1.

As shown in FIG. 5, the display control ECU 10 of the display apparatus 100 performs generation of a trial course using the trial course generation unit 11 in S01. The trial course generation unit 11 acquires, for example, the position (the trial start position) of the vehicle 1 and the virtual destination of the vehicle 1 that the occupant has input to the trial input unit 18. The trial course generation unit 11 generates the trial course from the trial start position to the virtual destination.

In S02, the display control ECU 10 performs acquisition of statistical information using the information acquisition unit 12. The information acquisition unit 12 acquires the statistical information regarding the past operation of the vehicle control in which the past operation information of the vehicle control and the position on the map are stored in association with each other. The information acquisition unit 12, for example, acquires the statistical information along the trial course from the trial start position to the virtual destination.

In S03, the display control ECU 10 performs calculation of the trial result using the trial result calculation unit 13. The trial result calculation unit 13 acquires, for example, the trial setting value that the occupant has input to the trial input unit 18. The trial result calculation unit 13 calculates the trial result regarding the vehicle control operation according to the trial setting value when the vehicle 1 is caused to virtually travel along the trial course based on the trial setting value and the trial course. The trial result calculation unit 13 causes the vehicle 1 to virtually travel on the trial course while executing the vehicle control according to the trial setting value. For example, when the alert information is present on the trial course on which the vehicle 1 virtually travels, the trial result calculation unit 13 calculates the content of the alert information, the point on the trial course where there has been the alert information, and the trial setting value used during execution of the vehicle control, as the trial result.

In S04, the display control ECU 10 performs generation of a trial image using the image generation unit 15. The image generation unit 15 generates the trial image based on the statistical information on the trial course and the trial result. The image generation unit 15 generates, for example, the trial image indicating the situation in which the vehicle 1 virtually travels through the point on the trial course where there is the alert information. The image generation unit 15 may cause the trial image indicating, on the map, the point on the trial course where there is the alert information to be displayed. The trial image is an image for causing the occupant of the vehicle 1 to recognize the alert information in advance in the statistical information.

In S05, the display control ECU 10 performs a display of the trial image using the display control unit 16. The display control unit 16 causes the display 19 of the vehicle 1 to display the generated trial image. The display control unit 16 provides alert information to the occupants of the parked vehicle 1 by causing the display 19 to display the trial image. The display control unit 16 causes a trial image indicating a situation in which a virtually traveling vehicle 1 approaches or passes through the point on the trial course where there is the alert information to be displayed.

In S06, the display control ECU 10 performs storage of the notification information using the notification information storage unit 14. The notification information storage unit 14 stores the notification information including the alert position on the trial course corresponding to the alert information, and the trial setting value. Thereafter, the display control ECU 10 ends the processing in FIG. 5.

Figure 6:
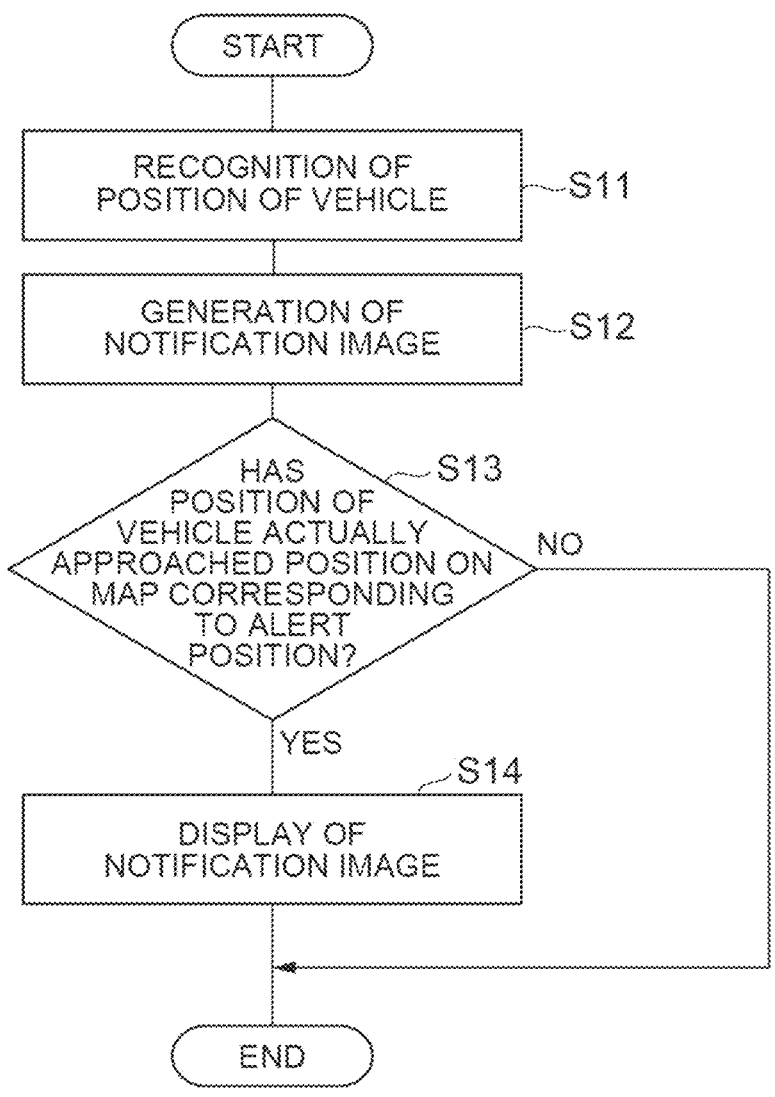
FIG. 6 is a flowchart showing an example of notification image display processing.

FIG. 6 is a flowchart showing an example of notification image display processing. Processes (steps) shown in FIG. 6 is repeatedly executed at every predetermined calculation cycle when the vehicle 1 travels on the trial course corresponding to the trial mode as the actual course of the vehicle control, for example, in a case in which the notification information is stored in the trial mode performed while the vehicle 1 is parked.

In S11, the display control ECU 10 performs recognition of the position of the vehicle using the image generation unit 15. The image generation unit 15 recognizes the position of the vehicle 1 (the position of the vehicle 1 on the map on the actual course of the vehicle control).

In S12, the display control ECU 10 performs generation of the notification image using the image generation unit 15. The image generation unit 15 generates, for example, a notification image including an image indicating a surrounding situation of the alert position included in the stored notification information and an image indicating the trial setting value included in the stored notification information, based on the notification information stored in S06 of FIG. 5.

In S13, the display control ECU 10 performs a determination as to whether the position of the vehicle 1 has approached the position on the map corresponding to the alert position using the display control unit 16. For example, when the distance between the position of the vehicle 1 on the map and the position on the map corresponding to the alert position is actually equal to or smaller than the predetermined approach threshold, the display control unit 16 determines that the position of the vehicle 1 has approached the position on the map corresponding to the alert position. For example, when the distance between the position of the vehicle 1 on the map and the position on the map corresponding to the alert position is actually larger than a predetermined approach threshold, the display control unit 16 determines that the position of the vehicle 1 does not approach the position on the map corresponding to the alert position.

When the display control unit 16 determines that the position of the vehicle 1 has approached the position on the map corresponding to the alert position (S13: YES), the display control ECU 10 proceeds to a process of S14. When the display control unit 16 determines that the position of the vehicle 1 does not approach the position on the map corresponding to the alert position (S13: NO), the display control ECU 10 ends the processing in FIG. 6.

In S14, the display control ECU 10 performs a display of the notification image using the display control unit 16. The display control unit 16 causes the display 19 of the vehicle 1 to display the generated notification image. The display control unit 16 causes the display 19 to display the notification image to provide the notification information to the occupant of the vehicle 1 traveling on the trial course as the actual course of the vehicle control. Thereafter, the display control ECU 10 ends the processing in FIG. 6.

[Display Program]

The display program causes the display control ECU 10 (computer) to function (operate) as the trial course generation unit 11, the information acquisition unit 12, the trial result calculation unit 13, the notification information storage unit 14, the image generation unit 15, and the display control unit 16 described above. The display program is provided, for example, by a non-transitory storage medium such as a ROM or a semiconductor memory. Further, the display program may be provided via communication via a network or the like.

According to the display apparatus 100, the display method, and the display program described above, the trial result regarding the vehicle control operation according to the trial setting value when the vehicle 1 is caused to virtually travel along the trial course is calculated based on the trial course and the trial setting value. The trial image generated based on the statistical information on the trial course and the trial result is displayed on the display 19 of the vehicle 1. This makes it possible for the occupant to recognize in advance how the vehicle control will operate depending on a road situation, using the alert information on the trial course as a clue.

In the display apparatus 100, the display method, and the display program, notification information including the alert position on the trial course corresponding to the alert information, and the trial setting value is stored. When the vehicle 1 travels on the trial course as the actual course of the vehicle control, the notification image including the trial setting value is generated based on the notification information. The notification image is displayed on the display 19 when the position of the vehicle 1 has actually approached the position on the map corresponding to the alert position. This makes it possible for the occupant to recognize that the vehicle 1 is approaching the position on the map corresponding to the alert position, and the trial setting value.

In the display apparatus 100, display method, and display program, the trial setting value is the set vehicle speed regarding the autonomous driving control among the vehicle controls. The alert information is information on temporary suspension of the autonomous driving control based on the vehicle speed of the vehicle 1 when the vehicle 1 executing the autonomous driving control travels on a curve. This makes it possible for the occupant to recognize in advance whether the autonomous driving control is temporarily suspended on the curve depending on the set vehicle speed.

The display apparatus 100 can cause the occupant of the vehicle 1 to experience in advance, for example, a place where the alert information tends to be statistically present, thereby causing the occupant of the vehicle 1 to prepare an advanced safety function of the vehicle 1 before the advanced safety function is actually used. As a result, when the vehicle 1 travels on the trial course as the actual course of the vehicle control, it can be expected that the vehicle control will be utilized more effectively than when no experience has been made in advance. Since the occupant can perform a trial in the virtual reality space in which the vehicle 1 is used as a hardware resource for calculation the same as in the real world, it is possible to try various functions of the vehicle 1 as in actual traveling. For example, the trial input unit 18 may also accept override of acceleration or deceleration and steering of the vehicle 1 and reflect the override in the trial result.

Although the embodiment of the present disclosure has been described above, the present disclosure is not limited to the embodiment.

In the embodiment, the display apparatus 100 includes the statistical information storage unit 17, but, in some embodiments, the statistical information storage unit 17 is not included. In some embodiments, the notification image in the image generation unit 15 is not generated. In some embodiments, the display control unit 16 may not cause the notification image to be displayed.

The number of times the trial result is calculated in the embodiment is not particularly limited. The number of times the trial result is calculated may be one or may be two or more times. The number of times the trial setting value is adjusted is not particularly limited. The number of times the trial setting value is adjusted may be one time or may be two or more times.

Although, in the embodiment, the trial course generation unit 11 has generated the trial course from the trial start position to the virtual destination, the trial course generation unit 11 may also generate a trial course from a position other than the trial start position.

What is claimed is:

1. A display apparatus for vehicle provided in a vehicle capable of executing vehicle control including drive assistance control and autonomous driving control, the display apparatus for vehicle comprising:

an electronic control unit configured to:

generate a trial course for the vehicle control based on map information and a virtual destination of the vehicle;

acquire statistical information regarding a past operation of the vehicle control in which past operation information of the vehicle control and a position on a map are stored in association with each other;

calculate a trial result regarding an operation of the vehicle control according to a trial setting value regarding the vehicle control when the vehicle is caused to virtually travel along the trial course, based on the trial setting value and the trial course;

generate a trial image for causing an occupant of the vehicle to recognize alert information of the statistical information in advance, based on the statistical information on the trial course and the trial result;

cause a display unit of the vehicle to display the trial image;

store notification information including an alert position on the trial course corresponding to the alert information, and the trial setting value;

generate a notification image including the trial setting value based on the notification information when the vehicle travels on the trial course as an actual course of the vehicle control; and cause the display unit to display the notification image when a position of the vehicle approaches a position on the map corresponding to the alert position.

2. The display apparatus for vehicle according to claim 1, wherein the trial setting value is a set vehicle speed regarding the autonomous driving control of the vehicle control, and the alert information is information on temporary suspension of the autonomous driving control based on a vehicle speed of the vehicle executing the autonomous driving control when the vehicle travels on a curve.

3. A display method using a display apparatus for vehicle provided in a vehicle capable of executing vehicle control including drive assistance control and autonomous driving control, the display method comprising:

generating a trial course for the vehicle control based on map information and a virtual destination of the vehicle;

acquiring statistical information regarding a past operation of the vehicle control in which past operation information of the vehicle control and a position on a map are stored in association with each other;

calculating a trial result regarding an operation of the vehicle control according to a trial setting value regarding the vehicle control when the vehicle is caused to virtually travel along the trial course, based on the trial setting value and the trial course;

generating a trial image for causing an occupant of the vehicle to recognize alert information of the statistical information in advance, based on the statistical information on the trial course and the trial result;

causing a display unit of the vehicle to display the trial image; and storing notification information including an alert position on the trial course corresponding to the alert information, and the trial setting value; and generating a notification image including the trial setting value based on the notification information when the vehicle travels on the trial course as an actual course of the vehicle control, and causing the display unit to display the notification image when a position of the vehicle approaches a position on the map corresponding to the alert position.

4. A non-transitory storage medium storing a display program for causing a computer to function as a display apparatus for vehicle provided in a vehicle capable of executing vehicle control including drive assistance control and autonomous driving control, the display program causing the computer to:

generate a trial course for the vehicle control based on map information and a virtual destination of the vehicle;

acquire statistical information regarding a past operation of the vehicle control in which past operation information of the vehicle control and a position on a map are stored in association with each other;

calculate a trial result regarding an operation of the vehicle control according to a trial setting value regarding the vehicle control when the vehicle is caused to virtually travel along the trial course, based on the trial setting value and the trial course;

generate a trial image for causing an occupant of the vehicle to recognize alert information of the statistical information in advance, based on the statistical information on the trial course and the trial result;

cause a display unit of the vehicle to display the trial image;

store notification information including an alert position on the trial course corresponding to the alert information, and the trial setting value;

generate a notification image including the trial setting value based on the notification information when the vehicle travels on the trial course as an actual course of the vehicle control; and cause the display unit to display the notification image when a position of the vehicle approaches a position on the map corresponding to the alert position.

* * * * *